May 27, 1930.  T. COLLINS  1,760,297
KNOTTING APPLIANCE
Filed Feb. 8, 1928   2 Sheets-Sheet 1
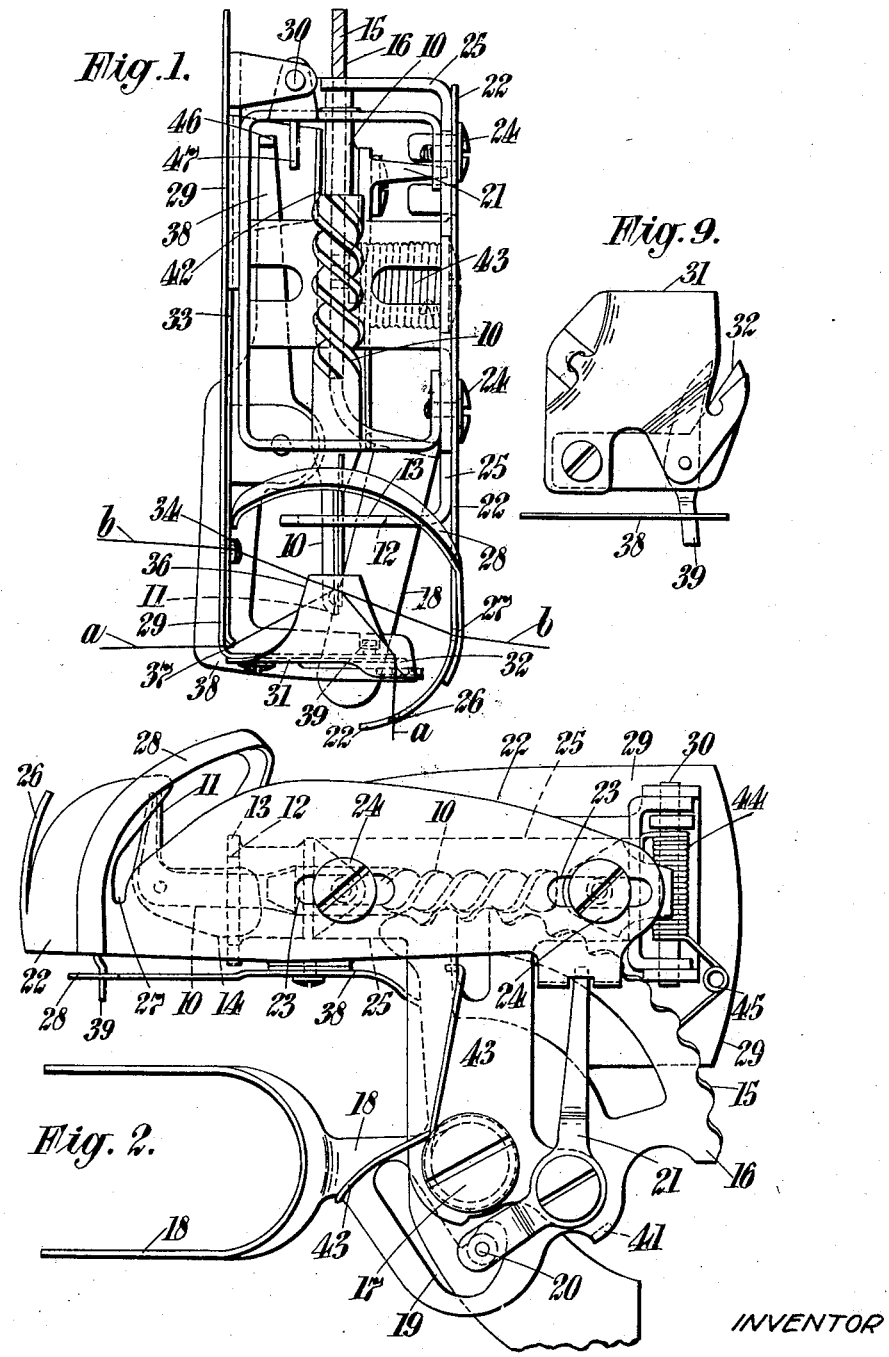

May 27, 1930. T. COLLINS 1,760,297
KNOTTING APPLIANCE
Filed Feb. 8, 1928 2 Sheets-Sheet 2
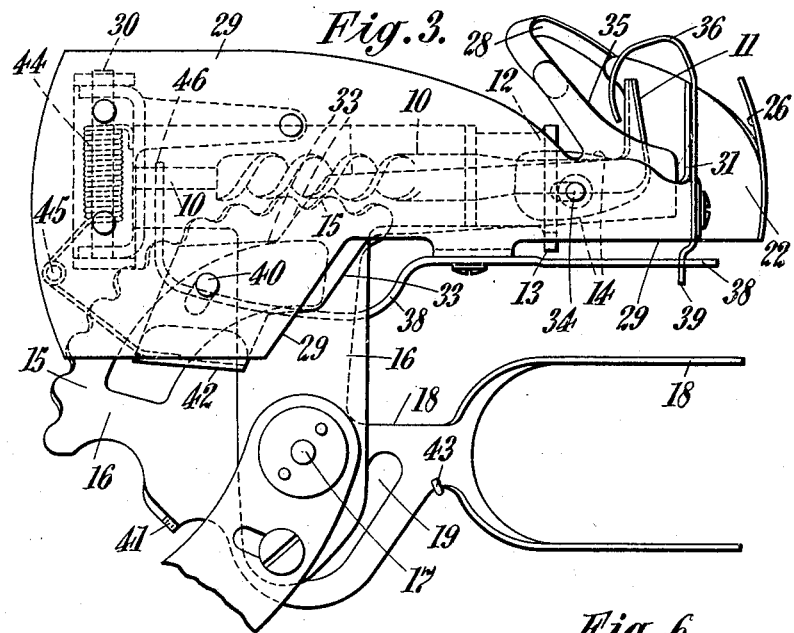
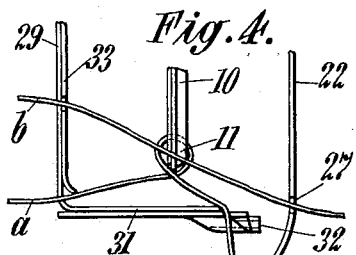
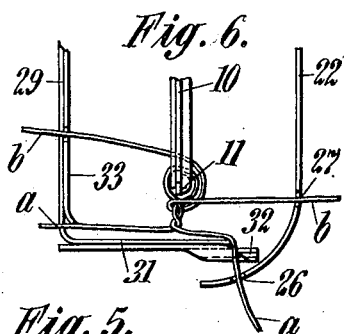
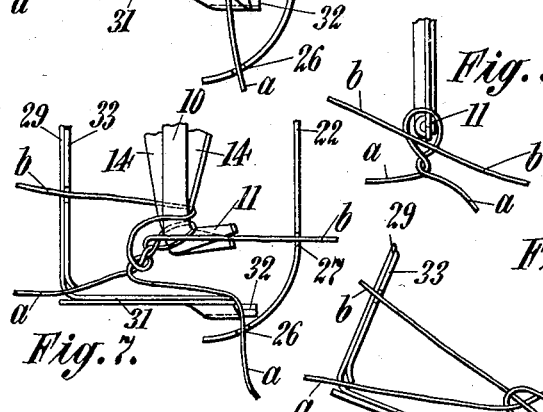
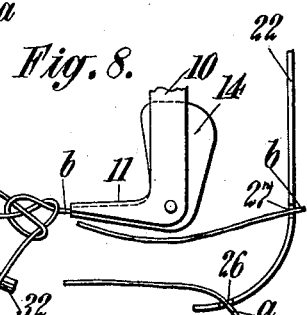
INVENTOR
Thomas Collins
BY
Ruegg, Bayn & Bakelen
ATTORNEY Patented May 27, 1930

1,760,297

UNITED STATES PATENT OFFICE

THOMAS COLLINS, OF TIMPERLEY, ENGLAND, ASSIGNOR TO COOK & CO., MANCHESTER, LIMITED, OF MANCHESTER, ENGLAND, A BRITISH COMPANY

KNOTTING APPLIANCE

Application filed February 8, 1928, Serial No. 252,779, and in Great Britain May 19, 1927.

This invention has reference to knotting appliances and has for its object to provide an appliance for making weavers' knots.

In knotting appliances for making weavers' knots as commonly used it is necessary, in order to tie the knot, to lay the strands across the appliance in such a manner that they are crossed before the knotting operation commences. This arrangement has disadvantages as the laying of the strands in the desired cross position is not always as easily and quickly accomplished as is desirable.

In the knotting appliances according to this invention the strands to be knotted are laid across the device in a knotting position from the same side of and behind the rotating bill without being crossed, the strand nearer to the bill passing through a holding slot on a pivoted arm crossing in front of the bill and passing through a scissor grip and cutter at the other side of the bill and carried on the pivoted arm whereby the rotation of the bill first loops the strand nearest to it around the bill (and thereafter engages the next strand) and loops it finally completing the knot, one strand being cut by the scissors on the pivoted arm, and the other being cut by the scissors on the knotting bill.

The invention is more particularly set forth with reference to the accompanying drawings wherein a knotting appliance according to this invention is illustrated.

Fig. 1 is a plan of a knot tying apparatus according to this invention showing two strands in position for the knotting operation to be commenced.

Fig. 2 is a side elevation and Figs. 3 is a side elevation in the opposite direction.

Fig. 4 is a plan showing the position of the parts operating on the yarn when the knotting bill has made the first half of the first rotation.

Fig. 5 is a view showing the strands around the knotting bill at the end of the first complete rotation of the knotting bill.

Fig. 6 is a similar view at the end of the first half of the second rotation of the knotting bill.

Fig. 7 is a similar view at the end of the second half of the second rotation.

Fig. 8 shows the apparatus at the conclusion of the knotting operation and the completed knot below.

Fig. 9 is an enlarged view of a scissor mechanism on the apparatus.

As shown in the drawings, the knotter is provided with a rotating spindle 10 having a knotting scissor bill 11 at the end of it, the scissors being opened and closed by the rotation of the spindle eccentric within a hole 12 in a cross member 13, the spindle having projections 14 co-operating with the hole. The spindle has upon it a rapid thread engaged by teeth 15 on a quadrant 16 pivoted at 17 below the spindle 10 and having an extension 18 for operation of the device by the thumb or fingers. The quadrant 16 has a lower extension provided with a slot 19 in which runs a pin 20 on a pivoted arm 21 connected to and operating a sliding arm 22 having slots 23 running on screw pins 24 projecting from the side member 25 of the framework in which the bill is carried. The connection between the parts is so arranged that as the thumb or finger piece 18 is depressed to rotate the spindle 10 and knotting scissor bill 11, the sliding side arm 22 is given alternately a forward movement and a reverse movement. The nose or front end of the sliding arm 22 is slightly turned inward towards the knotting bill and has a slot 26 at its front end and a slot 27 in the side from the front edge of which an arm 28 passes across the device, the two slots being for the purpose of receiving the ends of the strands of yarn to be knotted.

On the opposite side of the device to the sliding arm 22 referred to is an arm 29 pivoted at the back of the device at 30 and this arm has at its front end a right angled portion 31 which extends toward the sliding arm 22 and across the front of the knotting scissor bill 11. This right angled portion 31 at its extreme end has a scissor mechanism 32 which before the operation of the device commences is immediately behind the slot 26 on the sliding arm 22. The pivoted arm 29 has a hood or guide portion 36 covering the knotting bill scissors which guides one strand of yarn into place behind the bill. The pivoted arm also has upon it a secondary sliding arm 33 pivoted at 34 provided with a receding horn 35 co-operating with a shaped portion on the pivoted member 29 to form a slot 37 and the sliding member 33 when pushed forward engages the right angled portion 31 on the front of the pivoted member 29 and thus nips between it and the face of the right angled portions anything that may be in the slot formed between them.

Pivoted on the underside of the pivoted arm 29 is a swinging arm 38 having a slot at its outer front end into which a tongue 39 from the scissor mechanism 32 projects. This swinging arm 38 has only a limited motion and has a turned up portion 46 at the other end projecting between a pin 47 and the side of the frame, which turned up portion when pressed against the side of the frame as the arm 29 swings outwardly causes the arm to swing and operate the scissors 32. The secondary sliding arm 33 also projects to the rear of the device and by a slot running on a screw or pin 40 is guided to be raised and lowered whereby the arm 33 is moved forward and backward. The forward movement is effected by a tongue 41 on the quadrant 16 engaging an ear or projection 42 on the inner end of the arm, so that as the tongue 41 forces up the projection 42, the secondary sliding arm 33 is operated as already described to close the slot 37. The quadrant 16 is operated against the action of a spring 43 which returns it to the normal position when free to do so, likewise the pivoted arm 29 and the secondary sliding arm 33 are operated against and are returned to the normal position by springs 44 and 45 respectively.

When it is desired to knot two pieces of yarn $a$ and $b$ they are laid across the device as shown so that one $a$ passes between the secondary sliding member 33 at the right angled end of the pivoted arm 29 and after passing behind the knotter bill 11 by virtue of the hood or guide portion 36 is taken through the scissors 32 at the end of the right angled member 31 and thence through the outermost slot 26 on the sliding arm 22. The other strand of yarn $b$ is taken in the slot formed by the receding horn 35 of the secondary sliding arm 33 on the pivoted arm 29 and the pivoted arm itself and is passed over behind the knotter bill 11 through the innermost slot 27 on the sliding arm at the other side, thus one strand of yarn $b$ lies in a straight line between the two inner slots and the other strand $a$ lies in front of it and in passing from the slot on one side to the scissors and the slot on the other side, is deflected considerably from a straight line by the knotting bill. When the strands of yarn are in this position as shown particularly in Fig. 1, the finger and thumb piece 18 is depressed and the knotting bill turns over to the left as viewed when one is facing the front of the apparatus. The first half rotation of the bill operates only on the strand $a$ and makes one loop of the strand on the bill, as shown in Fig. 4. Further rotation of the bill brings it to the position shown in Fig. 5 and by this time one loop of the strand $a$ still remains around the bill, the strands being given a complete rotation in front of the bill and the strand $b$ has been carried across to the front of the bill and lies over the twist of the strand $a$ as shown in Fig. 5. A further half rotation of the knotting bill now carries it between the strands $a$ and $b$ and the strand $b$ has now been looped into the strand $a$, as shown in Fig. 6. A further half rotation brings the knotting bill upwards and as it rises its scissors are opened to cut and hold the strand $b$ on the right hand side of the bill. At the same time the pivoted arm 29 commences to swing outward and the strand $a$ is nipped by the secondary sliding arm 33 as shown in Fig. 7. Further rotation of the knotting bill for a quarter turn results in the pivoted arm 29 being thrown out to its full extent and also results in the scissors 32 cutting the strand $a$. As the cut end of the strand $b$ is held by the knotting bill scissors the outward movement of the pivoted arm 29 will pull the loop around the knotting bill over the end held in the bill. This action corresponds to passing the free end of the strand $b$ through the loop around the bill. As the strand $b$ is held by the knotting bill scissors and the strand $a$ is held by the secondary sliding arm 33 against the front of the right angled portion 31 of the pivoted arm 29 it follows that by pulling the loop off the knotting bill scissors the knot is completed and is pulled off the knotting bill in a tight form as shown in Fig. 8.

By means of a knotting appliance constructed according to this invention the operations of laying the ends of yarn across the device and forming the knot are much more easily and quickly effected than in knotters where the ends have to be crossed before the operation of knotting can be commenced.

What I claim as my invention and desire to secure by Letters Patent is:—

1. A device for tying weavers' knots having means whereby the device is held, a supporting member, a frame carried by said supporting member, a rotatable knotting bill mounted in said frame, hand operated means for operating said knotting bill, a member pivotally mounted on one side of said frame, a member slidably mounted on the other side of said frame, a curved portion at the end of said member passing partly across the front of said frame, a yarn slot near the end of said curved portion, a yarn slot in the straight portion of said member, a guiding horn projecting upwardly from near the front edge of said yarn slot in said straight portion, said guiding horn passing across said frame, a slot in said sliding member near its rear end, and on the underside, a pivot on said supporting member, a lever mounted on said pivot, one arm of said lever engaging said slot at the rear of said sliding arm, a slot in said hand operated means for operating said knotting bill, the other arm of said lever overhanging said slot, a pin on said arm engaging said slot whereby the movement of said hand operated means to rotate said knotting bill reciprocates said sliding member.

2. A device for tying weavers' knots having means whereby the device is held, a supporting member, a frame carried by said supporting member, a rotatable knotting bill mounted in said frame, hand operated means for operating said knotting bill, a member slidably mounted on one side of said frame, a member on the other side of said frame and pivotally mounted at the rear thereof, said member being bent at right angles at the front end to pass across the end of said rotary knotting bill, an attachment on said bent portion having a hood projecting over said knotting bill, a scissors on said bent portion aligning when said device is not in operation with a slot near the end of said sliding member, a pivoted arm mounted on the underside of said pivoted member operatively engaging said scissors at one end and engaging a stop on said frame at the other end, a secondary sliding and pivoted member carried on the inside face of said pivoted member, a backwardly projecting horn thereon aligning with a projecting horn carried by said sliding member on the other side of said frame, and a projection at the rear underside of said secondary sliding and pivoted member, an operating quadrant carried by said support and actuated by said hand operated means, a projection on said quadrant co-operating with said projection at the rear underside of said secondary sliding member, first to move forward said secondary sliding member to bring its end into pressure against the turned front end of said pivoted member, and thereafter to move said pivoted arm outward on its pivot, said outward movement turning said scissor operating bar and operating said scissors.

3. A device for tying weavers' knots having means whereby the device may be held by the user, a supporting member adjustably and detachably secured on said holding means, a frame carried on said supporting member, a rotatable knotting bill mounted in said frame, scissors on said knotting bill, a slidable member on one side of said frame, a pivoted side member on the other side of said frame, a secondary pivoted and sliding member on said pivoted member, scissors at the end of said pivoted member, a scissors operating means on said pivoted member, a hood over said knotting bill scissors, and on said pivoted member, a rearwardly projecting horn on said secondary sliding member, a slot in said sliding member, a horn projecting from the front edge of said slot and passing across said frame and over-lapping said rearwardly projecting horn on said secondary sliding member, a slot in said sliding member aligned with said scissors on said pivoted member, one of the strands to be knotted being laid across the appliance behind the knotting bill scissors and being guided into place behind the horn on the secondary sliding member and the horn on the sliding member, and the other being placed between the end of the secondary sliding member and the pivoted member and behind the knotting bill scissors and through the scissors on the end of said pivoted arm and through the slot aligned therewith in the sliding arm whereby when the hand operated means is actuated the knotting bill is rotated and said moving parts synchronized therewith tie a weaver's knot and pull it off the knotting bill, each of said scissors performing a cutting operation to sever the knot from the yarn remaining and beyond the knot.

4. A device for tying weavers' knots having means whereby the device is held, a supporting member, a frame carried by said supporting member, a rotatable knotting bill mounted in said frame, a screw thread on said knotting bill, a toothed and pivoted quadrant, engaging said screw thread, hand operated means for turning said quadrant on its pivot, a slidable side member mounted on one side of said frame, an arm on the latter member extending over across the knotter, a pivoted side member on the other side of said frame, adapted to swing outwardly, a horn on said member cooperating with said arm extending across the knotter, a secondary member mounted on said pivoted side member and adapted to slide and turn thereon, and means on said quadrant for reciprocating said sliding member, and means on said quadrant for moving said secondary sliding and pivoted member on said pivoted arm and for moving said pivoted arm outwards on its pivot.

In testimony whereof I have signed my name to this specification.

THOMAS COLLINS.